3,501,221
OPTICAL FILTERING
Adolf W. Lohmann, Los Gatos, Calif., assignor to International Business Machines Corporation, Armonk, N.Y., a corporation of New York
Filed June 29, 1967, Ser. No. 649,895
Int. Cl. G02b 5/18, 5/20, 27/38
U.S. Cl. 350—162                                          8 Claims

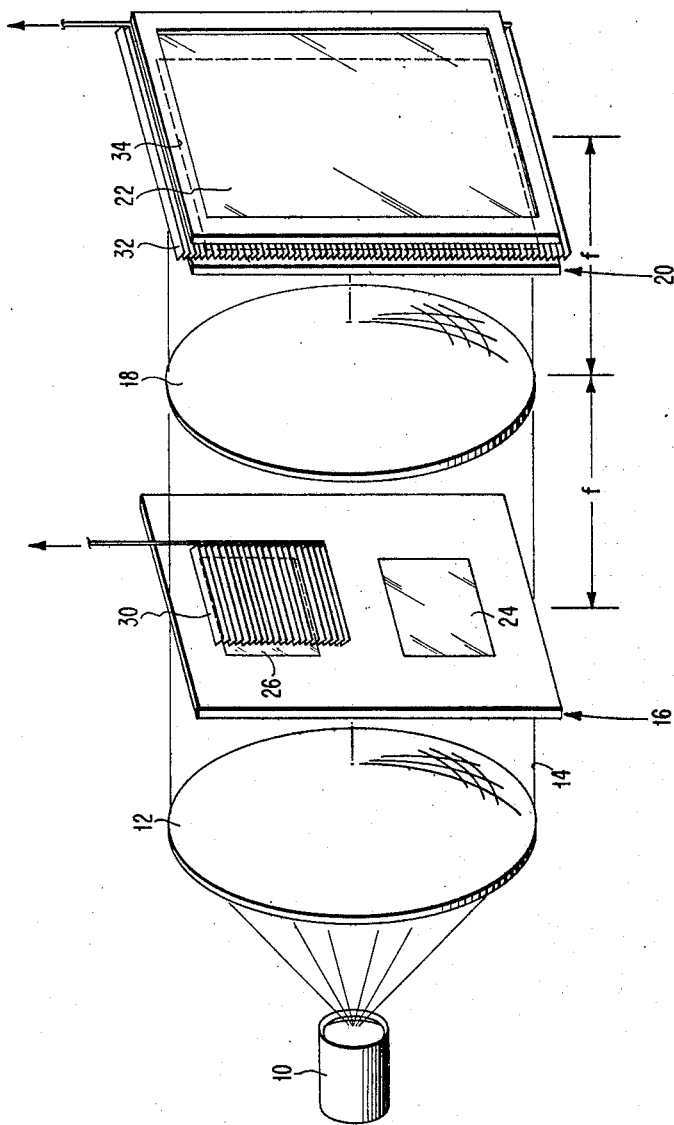

ABSTRACT OF THE DISCLOSURE

Optical apparatus in which object and desired image transparencies are positioned side by side in the input plane of a lens. Illumination through the lens falls on a photochromic plate and thence on a photographic film. During a first exposure, of the photochromic plate, the image transparency and photographic film are shuttered so that only the Fourier transform of the object transparency excites the photochromic plate. During a second exposure, the shutters are opened so that the Fourier transforms of both the object and image transparencies excite the photochromic plate and photographic film. Upon development, the photographic film will store the filter required in an optical system to convert the object to the image.

---

This invention relates to optical filtering and, more particularly, to an analog method and means therefor for converting a light wave emanating from a given object into a wave representing a desired image.

For the conversion of the object $u(x, y)$ into the image $v(x, y)$ by means of spatial filtering, the following filter function is needed:

$$F_D(\nu_x, \nu_y) = \tilde{v}(\nu_x, \nu_y)/\tilde{u}(\nu_x, \nu_y)$$

Here, $\tilde{u}$ and $\tilde{v}$ are the Fourier transforms of the object and the image, respectively, and the spatial frequency components are denoted by $(\nu_x, \nu_y)$.

A technique to provide spatial filters for conversion has been described by D. Gabor, "Character Recognition by Holography," Nature, vol. 208, page 422, Oct. 30, 1965; this is a holographic system which produces a function:

$$F_G(\nu_x, \nu_y) = \tilde{v}\tilde{u}^* = |\tilde{u}|^2 \tilde{v}/\tilde{u}$$

which is, in essence, the same as $\tilde{v}/\tilde{u}$ only in the special case where the spatial power spectrum $|\tilde{u}|^2$ of the object is nearly constant; in all other cases, it is apparent that the filter $F_G$ will not be precise in its conversion of object to image.

P. F. Mueller and G. O. Reynolds, "Image Restoration by Removal of Random-Media Distortions," J. Opt. Soc. Am. vol. 56, p. 1438, 1966, reports on the use of a photographic negative for implementing the operation of division. In their equipment, the intensity $|\tilde{u}|^2$ exposes a photographic plate. The amplitude transmission of the negative after development is approximately $1/|u|$. What is really produced, however, is an amplitude transmission of $1/\tilde{u}$, which is equivalent to $1/|\tilde{u}|$ only in the special case of non-phase objects. Due to the very special circumstances of their experiment, this approximation is satisfactory, since $u(x)$ is real and symmetrical, from which it follows that $\tilde{u}(\nu)$ is also real. A further requirement of $u(x)$ in this approach is that $\tilde{u}$ shall not be zero, since if $u$ equals zero, $1/u$ would be non-realizable. The aforementioned special assumptions limit the applicability of the Mueller and Reynolds filter.

The problem of code translation has been attacked in patent applications Ser. No. 587,507 filed Oct. 18, 1966, entitled "Code Translation Filter" by A. W. Lohmann, and Ser. No. 456,127 filed May 17, 1965, now abandoned, entitled "Complex Spatial Filter Consisting of Binary Elements" by A. W. Lohmann, both assigned to the assignee of this invention, which teach filter construction by digital computer techniques.

However, it would seem desirable to produce spatial filters by optical analog methods since it is anticipated that such methods would be simpler and more economical per unit information. This, then, is a general object of the present invention.

It is another object of this invention to provide an improved technique for optical code conversion.

A further object of the invention is to provide a method for making a wide range of spatial filters capable of converting any object into any image.

The foregoing and other objects, features and advantages of the invention will be apparent from the following more particular description of a preferred embodiment of the invention, as illustrated in the accompanying drawing.

In the drawing, point source of monochromatic light 10 is stationed at the optical focus of collimating lens 12, which provides a wavefront of substantially parallel rays. This arrangement is a simple form for generating parallel monochromatic light, i.e., coherent light beam 14, and any other known means for this purpose, such as a laser, will be recognized as suitable by those familiar with this art. Beam 14 is directed through object plane 16 toward converging lens 18, which focuses on output plane 20. Illumination through output plane 20 strikes photographic film 22 which, of course, is exposed thereby. As shown in the preferred arrangement, all components noted above are positioned centrally on axes.

As previously mentioned, the technique of the present invention permits conversion of an object to a desired image. Preferably, both object and image comprise photographic transparencies 24, 26, respectively, and may take the form of microfilms of the same dimensions; they are positioned side by side in object plane 16 such that they are separated by at least their width.

Also in the system are a pair of shutters 30, 32 which, when opened, pass light substantially unattenuated but which, when closed, provide a complete block. Shutter 30 is stationed in the light path from image transparency 26 whereas shutter 32 is stationed between output plane 20 and photographic film 22.

Output plane 20 contains photochromic film 34, comprising a photochromic coating on a clear film backing, well-known as an image recording medium which exhibits a reversible change in its absorption spectrum upon radiation, the change dependent on the intensity and time of exposure.

With regard to the operation of the optical system shown, a first exposure, in which shutters 30 and 32 are closed, is made. This results in the impression in and storage by, photochromic film 34 of the Fraunhofer diffraction pattern of source 10, i.e., film 34 retains the Fourier transform $\tilde{u}$ of object 24 and its resulting transmission is the reciprocal $1/|\tilde{u}|^2$ since the film acts just as would a photographic negative. This is followed by a second exposure in which shutters 30 and 32 are open. This results in the impression in photochromic film 34 of the combined Fourier transforms of object 24 and image 26, i.e., of $|\tilde{u}|^2\tilde{v}/\tilde{u}$ and in the impression of photographic film 22 of the function $\tilde{v}/\tilde{u}$ due to cancellation of the intensity $|\tilde{u}|^2$ by the stored transmittance $1/|\tilde{u}|^2$ in photochromic film 34. Upon development, the film 22 is, of course, the filter $F_D$ which, in an optical system, is capable of converting object 24 into image 26.

While the invention has been particularly shown and described with reference to a preferred embodiment thereof, it will be understood by those skilled in the art that various changes in form and details may be made therein without departing from the spirit and scope of the invention.

Thus, although the system of the drawing is arranged such that light is transmitted through the various planes and the objects positioned therein, it is apparent that a system utilizing light reflection is also contemplated. Also, it may be mentioned that shutters 30 and 32 operate as light-blocking elements and may take any of the forms known for this purpose in photography and optics.

What is claimed is:

1. A method of making a spatial filter capable of converting an object into a prescribed image, comprising the steps of:
   positioning the object and image between a source of collimated radiation and a lens, the object and the image laterally spaced from each other in the object plane;
   positioning a photographic film at the Fourier transform plane of the lens;
   positioning a photochromic film between the lens and the photographic film adjacent the photographic film;
   preventing illumination of the image and the photographic film;
   making a first exposure of the source through the object and the lens onto the photochromic film;
   permitting illumination of the image and the photographic film;
   making a second exposure of the source through the object, the image, the lens and the photochromic film onto the photographic film; and,
   developing the photographic film;
   whereby the developed photographic film is said spatial filter.

2. Apparatus for making an optical filter comprising:
   a source of collimated radiation;
   first and second objects;
   means to position said objects, laterally spaced from each other in an object plane, for illumination by the radiation from said source;
   first and second storage media sensitive to said radiation;
   focus means to focus the radiation of said first object to impress the Fraunhofer diffraction pattern thereof on said first storage medium, said first and second storage media located at the Fourier transform plane of said focus means; and
   means to focus the radiation of both of said objects through said first storage medium onto said second storage medium to convert said second storage medium into said optical filter.

3. The apparatus of claim 2 wherein the radiation from said source is in the visible region of the frequency spectrum.

4. The apparatus of claim 3 wherein said objects comprise photographic transparencies.

5. The apparatus of claim 3 wherein said first storage medium comprises a photochromic transparency.

6. The apparatus of claim 5 wherein said second storage medium comprises a photographic film.

7. The apparatus of claim 6 and
   first shutter means having radiation passing and blocking conditions positioned between said second object and said focusing means and
   second shutter means having radiation passing and blocking conditions positioned between said photochromic film and said photographic film.

8. The apparatus of claim 2 wherein said Fourier transformation means comprises a lens.

References Cited

Lohmann: "Optical Analog Computer," IBM Technical Disclosure Bulletin, vol. 6, No. 10, March 1964, pp. 56, 57.

Gabor: "Character Recognition By Holography," Nature, vol. 208, Oct. 30, 1965, pp. 422, 423.

Weaver et al.: "A Technique for Optically Convolving Two Functions," Applied Optics, vol. 5, No. 7, July 1966, pp. 1248, 1249.

JOHN K. CORBIN, Primary Examiner

U.S. Cl. X.R.
350—160, 205